United States Patent [19]

Drevs

[11] Patent Number: 4,699,404
[45] Date of Patent: Oct. 13, 1987

[54] FLEXIBLE PVC COUPLING—"FLEXFIX"

[76] Inventor: Wesley E. Drevs, Rte. #1, Box 240-C, Sand Springs, Okla. 74063

[21] Appl. No.: 906,322

[22] Filed: Sep. 8, 1986

[51] Int. Cl.⁴ .............................................. F16L 47/00
[52] U.S. Cl. .................................. 285/244; 285/254; 285/236
[58] Field of Search ............... 285/242, 244, 252, 253, 285/254, 236, 239

[56] References Cited

U.S. PATENT DOCUMENTS

| | | | |
|---|---|---|---|
| 1,514,412 | 11/1924 | Wilkinson | 285/252 X |
| 2,882,072 | 4/1959 | Noland | 285/239 X |
| 3,524,661 | 8/1970 | Farnam | 285/239 |
| 3,789,445 | 9/1973 | King | 285/239 X |
| 4,179,142 | 12/1979 | Schopp | 285/239 |

FOREIGN PATENT DOCUMENTS 692803 8/1965 Italy ...................................... 285/244

Primary Examiner—Richard J. Scanlan, Jr.
Attorney, Agent, or Firm—Richard L. Miller

[57] ABSTRACT

A flexible PVC coupling is provided and consists of combining two reinforced PVC couplers with a flexible high pressure tube which can be easily bent into any position when installing and repairing PVC pipes.

10 Claims, 3 Drawing Figures

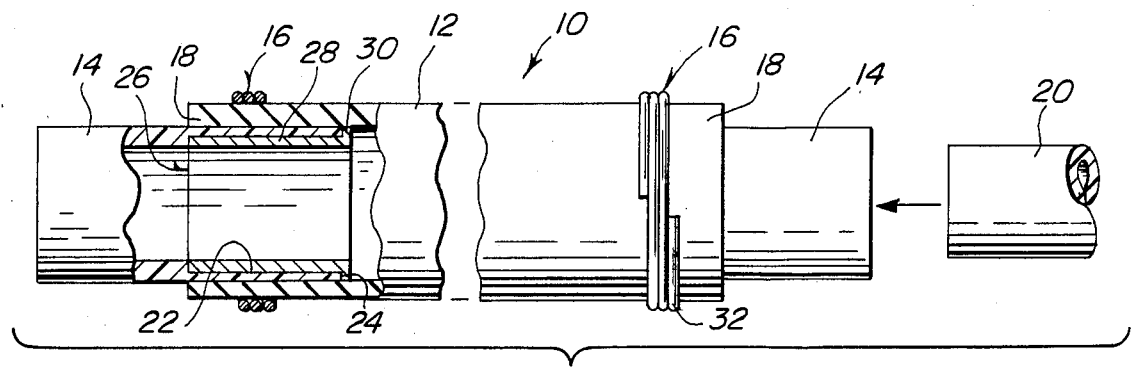
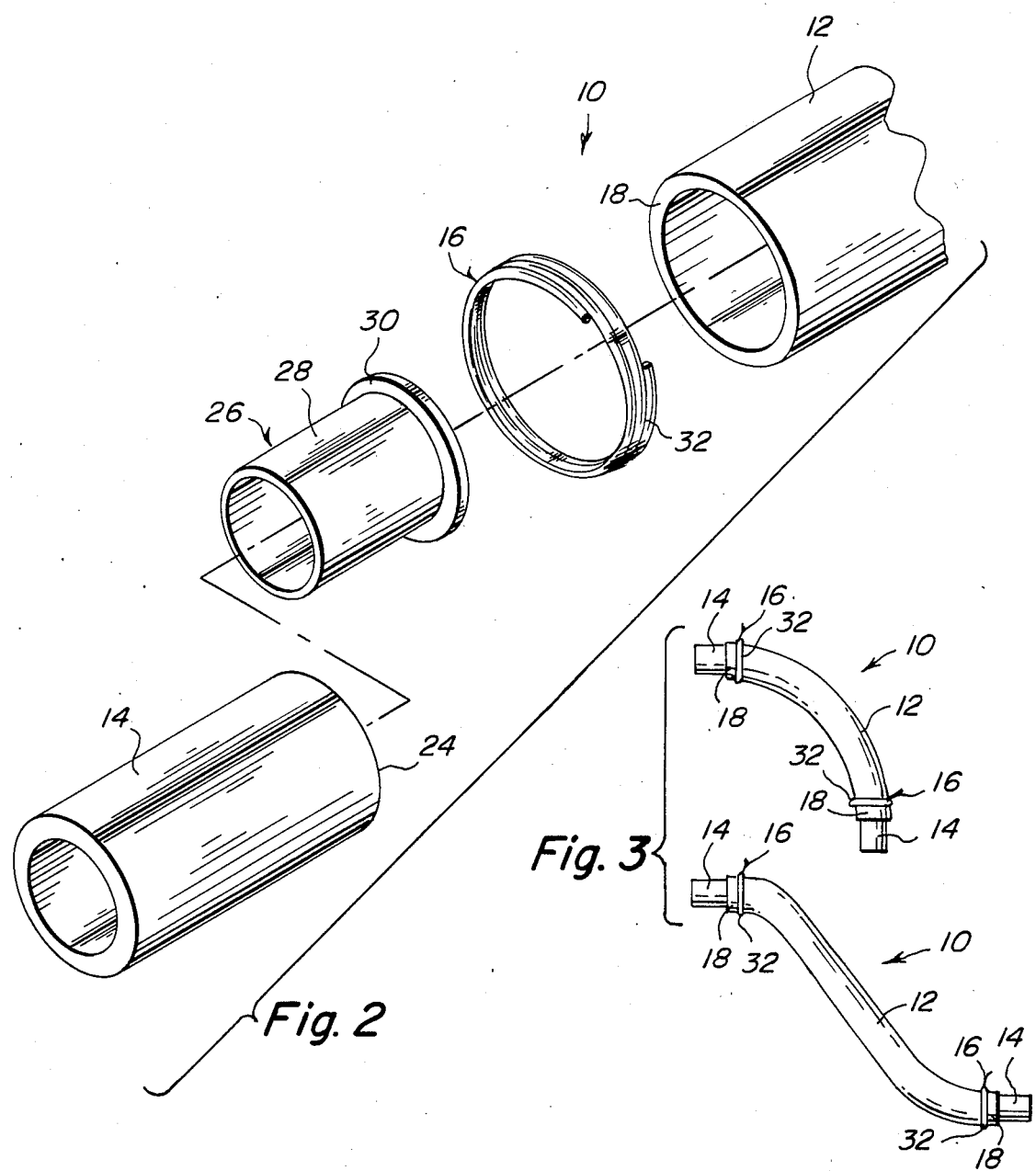

FLEXIBLE PVC COUPLING—"FLEXFIX"

BACKGROUND OF THE INVENTION

The instant invention relates generally to flexible tubing and more specifically it relates to a flexible (polyvinyl chloride) PVC coupling.

Numerous flexible tubing have been provided in the prior art that are adapted to contain ribbed and bellowed walls to increase strength of the tubing. For example, U.S. Pats. Nos. 3,210,234; 3,540,486 and 4,307,754 all are illustrative of such prior art. While these units may be suitable for the particular purpose to which they address, they would not be as suitable for the purpose of the present invention as hereafter described.

SUMMARY OF THE INVENTION

A primary object of the present invention is to provide a flexible PVC coupling that will overcome the shortcomings of the prior art devices.

Another object is to provide a flexible PVC coupling which can be easily bent into any position when installing and repairing PVC pipes.

An additional object is to provide a flexible PVC coupling that combines reinforced PVC couplers with a flexible high pressure tube thus making connections between PVC pipes fast saving down time, labor, parts and total cost of repairs.

A further object is to provide a flexible PVC coupling that is simple and easy to use.

A still further object is to provide a flexible PVC coupling that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a side view with parts broken away of the invention.

FIG. 2 is an exploded perspective view thereof.

FIG. 3 is a side view showing both a ninety degree and offset coupling use of the invention.

DETAILED DESCRIPTION OF THE PREFERRED EMBODIMENTS

Turning now descriptively to the drawings, in which like reference characters denote like elements throughout the several views, FIGS. 1, 2 and 3 illustrate a flexible PVC coupling 10 that consists of an elongated flexible high pressure tube 12, a pair of PVC, couplers 14 and securing hose clamps 16. The tube 12 is formed of elastic material and capable of being bent into any desired configuration (see FIG. 3). Each of the couplers 14 is partly inserted within ends 18 of the tube 12. The hose clamps 16 secure each of the couplers 14 to each of the ends 18 of the tube 12 so that each of the couplers 14 can be primed and glued to a PVC pipe 20.

In each of the PVC couplers 14 is forced fitted a stainless steel reinforcement insert 26 which extends about half way in from one end. The reinforcement insert 26 provided has a cylindrical body 28 and an annular flange 30. The cylindrical body 28 is pressed fit into the coupler 14 with the flange 30 abutting against the end 24 so that a portion of the coupler with the insert 26 can be inserted within end 18 of the tube 12.

It should be pointed out that the reinforced insert can either be fitted into a special fabricated coupler which has a stepped interior wall 22 as illustrated in FIG. 1, or in the alternative the insert can fit within the diameter of the coupler per se.

In either case it is desirable however that the inner diameter of the cylindrical body 28 of the insert 26 is of the same size or in the alternative only a slightly smaller size than inner diameter of the coupler 14 adjacent thereto so as to form as nearly as uniform inner diameter as possible therethrough. The securing hose clamp 16 can be of the spiral spring type 32 as illustrated or other types of conventional hose clamp that can be tightened to a higher degree may be substitute, depending upon the application of the device and the pressures that have to be withstood. Each of the hose clamps is mounted over the ends 18 of the tube 12 to secure the couplers 14 thereto. The insert 26 naturally adds strength to the coupler 14 and prevents the hose clamp 16 from collapsing or crushing the coupler while still permitting the clamp 16 to be made sufficiently tight to prevent the entire assembly 10 from coming apart even when extremes of pressure are involved. The tube 12 is fabricated out of rubber or conventional synthetic materials and may or may not be reinforced with woven fabric as is well known in the art, the inserts 26 are typically fabricated out of stainless steel and the couplers 14 are fabricated out of durable plastic typically PVC.

The invention is used on installation and repair of PVC pipe. The combination of the couplers 14 with the flexible tube 12 makes its uses limitless, such as making all repairs and installations simple, fast and easy, saving on down time, labor, parts and total cost of repairs. Plumbers, contractors and anyone else who works with PVC pipe would use the coupling 10 and keep it in stock at all times. It can also be made in various sizes to fit different PVC pipes. For higher pressure fittings and or ease of manufacturing a high pressure flexible woven fabric reinforced tube could be jet molded together with the PVC couplings making a one piece unit.

While certain novel features of this invention have been shown and described and are pointed out in the annexed claims, it will be understood that various ommissions, substitutions and changes in the forms and details of the device illustrated and in its operation can be made by those skilled in the art without departing from the spirit of the invention.

What is claimed is:

1. A flexible PVC coupling comprising:
   (a) an elongated flexible high pressure tube formed of elastic material and capable of being bent into any desired configuration;
   (b) a pair of PVC couplers, each of said couplers partly inserted within ends of said tube; and
   (c) means for securing each of said couplers to each of said ends of said tube so that each of said couplers can be primed and glued to a PVC pipe wherein each of said PVC couplers has a reinforcement insert therein said insert having a cylindrical body and an annular flange and which is press fitted into an interior wall of said coupler with said flange abutting against one end of said coupler so that a portion of said coupler with said insert can be inserted within one end of said tube.

2. A flexible PVC coupling as recited in claim 1, wherein inner diameter of said cylindrical body of said insert is almost of the same size as inner diameter of said coupler so as to form as nearly as possible a uniform inner diameter therethrough.

3. A flexible PVC coupling as recited in claim 2, wherein said securing means includes a pair of hose clamps, each of said hose clamps mounted over said ends of said tube to secure said couplers thereto.

4. A flexible PVC coupling as recited in claim 3, wherein said tube is fabricated out of rubber.

5. A flexible PVC coupling as recited in claim 4, wherein each of said inserts is fabricated out of stainless steel.

6. A flexible PVC coupling comprising:
(a) an elongated flexible high pressure tube formed of elastic material and capable of being bent into any desired configuration;
(b) a pair of PVC couplers, each of said couplers partly inserted within ends of said tube; and
(c) means for securing each of said couplers to each of said ends of said tube so that each of said couplers can be primed and glued to a PVC pipe wherein each of said PVC couplers comprises:
(i) a stepped interior wall extending about half way in from one end; and
(ii) a reinforcement insert having a cylindrical body and an annular flange in which said cylindrical body is pressed fit into said stepped interior wall of said coupler with said flange abutting against said one end so that a portion of said coupler with said insert can be inserted within one end of said tube.

7. A flexible PVC coupling as recited in claim 6, wherein the inner diameter of said cylindrical body of said insert is of the same size as the inner diameter of said coupler adjacent to said stepped interior wall so as to form a uniform inner diameter therethrough.

8. A flexible PVC coupling as recited in claim 7, wherein said securing means includes a pair of hose clamps, each of said hose clamps mounted over said ends of said tube to secure said couplers thereto.

9. A flexible PVC coupling as recited in claim 7, wherein said tube is fabricated out of rubber.

10. A flexible PVC coupling as recited in claim 9, wherein each of said inserts is fabricated out of stainless steel.

* * * * *